Jan. 5, 1960         J. W. GRAY         2,919,856
WIND COMPUTER
Filed June 25, 1956
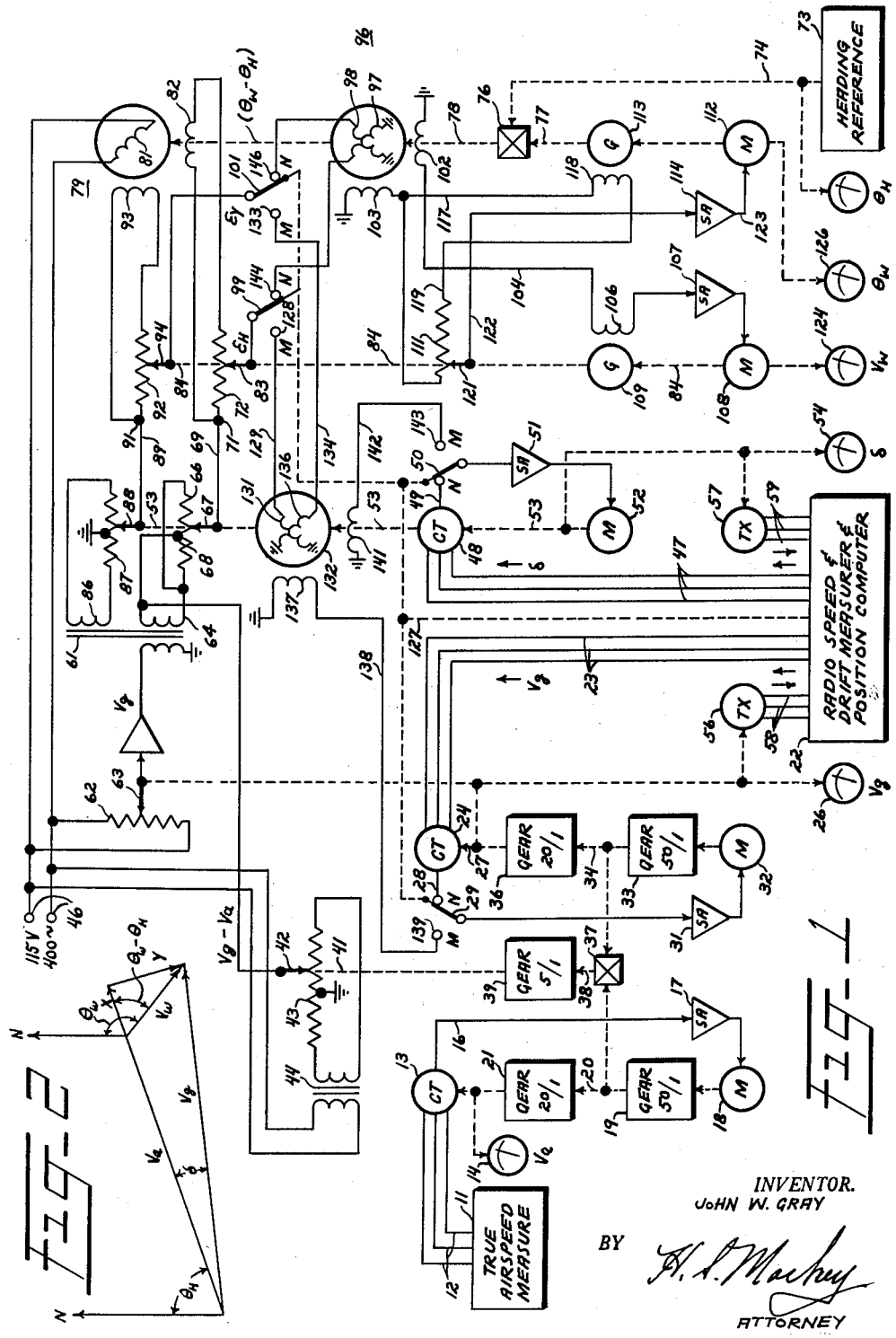
INVENTOR.
JOHN W. GRAY
BY
ATTORNEY

United States Patent Office

2,919,856
Patented Jan. 5, 1960

2,919,856

WIND COMPUTER

John W. Gray, Pleasantville, N.Y., assignor to General Precision Laboratory Incorporated, a corporation of New York Application June 25, 1956, Serial No. 593,786

5 Claims. (Cl. 235—187)

This invention relates to dead reckoning computers and more particularly to such computers which continuously provide an output signal during periods when some of the input data is temporarily withheld.

One form of aircraft computer continuously provides output signals and indications representing present position of the aircraft in flight, provided that starting position data have been inserted and that heading angle, $\theta_H$, drift angle, $\delta$, and aircraft ground speed, $V_g$, data are furnished continuously. The heading angle may be determined by a magnetic, astral or gyroscopic compass. Radio apparatus has been developed which continuously measures the drift angle and ground speed, this apparatus being on the aircraft and independent of ground stations.

Such computers are dependent upon continuity of input data. However, drift angle and ground speed data obtained by radio may be temporarily interrupted when radio silence is demanded or may be unreliable when their signal-to-noise ratios drop to a low value. Under such conditions it is desirable that the computer continue to compute present position from the best information available. Position computer operation with only a portion of the input data provided in the normal manner is often termed "memory" operation, and some form of it is usually provided for.

In one form of memory operation, upon failure of the drift angle and ground speed information the supply of these quantities to the computer is continued at the last determined, or "remembered" values, whereupon the computer will continue to indicate present position. However, any changes in speed and/or course will, in general cause changes in both $V_g$ and $\delta$, so that the described memory operation is entirely satisfactory only at constant speed on a straight course.

A better form of memory operation is secured by converting the output data into terms of wind speed, $V_w$, and wind direction angle, $\theta_w$. Upon discontinuance of radio data the last-remembered values of these quantities, together with continuously measured true air speed, $V_a$, are sufficient for the computation of ground speed and drift angle, and for the continuous calculation and presentation of a present position display. Changes in aircraft course or speed will not affect this computation. Such operation is obtained by means of an apparatus such as that described in the copending application of Gray and Tull, Serial No. 537,011 filed September 27, 1955, for Wind Computer, which describes apparatus in which a wind computer normally computes wind speed and wind direction continuously from heading angle, drift angle, air speed and ground speed data. No use is made of the computed wind speed and direction, however, until the device is thrown into memory operation, when connections are altered so that the wind speed and direction outputs are frozen at their attained values and ground speed and drift angle are computed from them. These computed values of $V_g$ and $\delta$ are supplied to the position computer in place of the radio data.

The instrumentation which is employed in the wind computer referred to above is based on the equations $$E_y = V_g \sin \delta - V_w \sin (\theta_w - \theta_H) \quad (1)$$

$$E_H = V_g \cos \delta - V_a - V_w \cos(\theta_w - \theta_H) \quad (2)$$

in which $E_H$ and $E_Y$ are servomechanism error signals representing aircraft speed errors in the heading direction and normal thereto respectively.

For the purpose of the instant invention Equation 1 is used without change, but Equation 2 is transformed into a form which eliminates the necessity of multiplying $V_g$ by $\cos \delta$ and which thereby permits considerable increase in overall accuracy. This new form of equation is arrived at by adding and subtracting $V_g$ from Equation 2 as follows:

$$E_H = V_g \cos \delta - V_a + V_g - V_w (\cos \theta_w - \theta_H) \quad (3)$$

Collecting terms and regrouping, $$E_H = (V_g - V_a) - V_g(1 - \cos \delta) - V_w \cos (\theta_w - \theta_H) \quad (4)$$

Equations 1 and 4 are instrumented to form the novel apparatus of this invention.

In Equation 4 the term $(V_g - V_a)$ is easily instrumented to high accuracy by mechanical differential gears. The form of the equation permits the other two terms to be instrumented by components scaled to wind velocity magnitudes instead of to the much greater aircraft velocity magnitudes, resulting in a severalfold increase in overall accuracy. Additionally, the four-winding resolvers which rotate the coordinate axes operate on error signals, so that low-accuracy instruments are satisfactory and high output accuracy is assured.

One object of this invention is to provide apparatus which allows aircraft to maneuver during periods of inoperativeness of the radio apparatus with substantial maintenance of accuracy of the position computer.

Another object of this invention is to provide apparatus of improved accuracy for use on an aircraft in computing wind speed and direction.

A further understanding of this invention may be secured from the detailed description and drawings associated therewith, in which:

Figure 1 depicts the circuit of an embodiment of the invention.

Figure 2 is a vector diagram of aircraft and wind speeds.

Referring now to Fig. 2, the vector $V_a$ represents true air speed of the aircraft, which of course is in the heading direction at the heading angle $\theta_H$ referred to the true North direction N. The wind direction makes an angle $\theta_w$ with the North direction and has a magnitude depicted by the vector $V_w$. The sum of the vectors $V_a$ and $V_w$ is of course the ground track velocity vector $V_g$, making the angle $\theta_H + \delta$ with true North. The components of wind velocity in the heading and cross-heading directions, $x$ and $y$, are now drawn, so that $$x = V_w \cos (\theta_w - \theta_H) \quad (5)$$

and $$y = V_w \sin (\theta_w - \theta_H) \quad (6)$$

In instrumenting these two triangles two expressions are obtained for the side $y$ and are equated by a servomechanism. Similarly two expressions for the side $x + V_a$ are obtained and equated. A solution is secured in terms of $V_w$ and $\theta_w$ for normal operation and by switching the electrical connections to form a different circuit a solution is secured in terms of $V_a$ and $\delta$ for memory operation.

Referring to Fig. 1, a true air speed measuring device 11 transmits an angular deflection representing air speed by means of a syncho circuit 12 to control transformer 13. The shaft of the control transformer 13 is secured to a dial 14 indicating air speed. The control transformer 13 additionally has an error signal output on conductors 16 which, after amplification in servoamplifier 17 is employed to operate a servo motor 18. The torque of this motor is amplified in 50:1 gear 19 and the speed of its output shaft 20 is further reduced in gear 21, the output of which is connected to position control transformer 13. The latter may thus be servoed to its zero error output position, when the indicator dial 14 will read the correct $V_a$ deflection.

A radio speed and drift measuring device with an associated aircraft position computer such as described in application Serial No. 410,882, filed February 17, 1954, is represented by rectangle 22. In place of this radio device any other device giving similar output signals might be employed. Ground speed indication in terms of angular deflection is transmitted therefrom by a synchro circuit 23 to a control transformer 24 having a ground speed display dial 26 secured to its shaft 27. The control transformer 24 additionally emits an output signal on conductor 28 which, after passing through a switch 29 and servo-amplifier 31 is employed to operate a servomotor 32. The torque of this motor is amplified 50 times in gear 33 and the speed of output shaft 34 is further reduced 20 times in gear 36, the output being connected to shaft 27 to position the control transformer 24. The latter may thus be servoed to its zero error output position, where indicator dial 26 will read the correct $V_g$ indication.

Shafts 20 and 34 are connected to serve as inputs to a differential gear 37, the senses of rotation being such that the difference of their angular deflections is secured at output shaft 38. The speed of this shaft is reduced five times in gear 39, and its output shaft 41 is employed to position the slider 42 of a potentiometer 43. This potentiometer has a grounded center tap and is energized by alternating current through transformer 44 from 400-cycle terminal 46, so that the slider potential represents positive and negative values by its phase sense in accordance with slider position relative to the center tap, and represents by its magnitude, the magnitude of the quantity $V_g - V_a$ in accordance with the difference of the deflections of the control transformers 13 and 24.

The radio measuring device 22 emits an electrical angular deflection signal on synchro conductors 47 representing the magnitude of the drift angle $\delta$, and control transformer 48 is thereby positioned by means of its error signal on conductor 49, through switch 50 to servoamplifier 51 and servomotor 52. The shaft 53 of motor 52 is connected to the control transformer shaft and also to a drift angle indicator 54. In this servomechanism as in all others of this device gears are conventially desirable and may be employed for changing shaft speeds between components for a variety of reasons. However, to simplify the description all such details have been omitted except where they are essential for a complete understanding of the operation of the invention.

The ground speed and drift angle indications of shafts 27 and 53 are transmitted by electrical angle transmitters 56 and 57, which may be synchro transmitters, and through electrical cables 58 and 59 to the position computing portion of device 22.

A transformer 61 is energized by alternating potential from a potentiometer 62 the slider 63 of which is connected to shaft 27, so that the transformer energizing potential is proportional to $V_g$. A secondary winding 64 is connected to a non-linear potentiometer 66 having a taper obeying the function unity minus cosine. The slider 67 thereof is connected to the output shaft 53 of motor 52, so that the slider displacement represents $\delta$. If the center tap 68 of potentiometer 66 were grounded its slider potential would represent $V_g(1-\cos \delta)$. However, center tap 68 is connected to conductor 42 carrying a potential representing $V_g - V_a$, and the slider potential is therefore the algebraic sum. Phases are arranged so that the slider instantaneous potentials are difference potentials, and represent $(V_g - V_a - V_g(1-\cos \delta))$, which are the first two terms of the right side of Equation 4. Slider 67 is connected through conductor 69 to one end terminal 71 of a potentiometer 72, so that this terminal 71 has a potential with respect to ground representing the above two terms of Equation 4.

A heading reference 73, which may comprise a magnetic compass or other device providing a reference direction, has an output shaft 74 having an angular deflection representing the angle $\theta_H$. Shaft 74 is connected to apply this deflection to a differential gear 76. A second input shaft 77 applies a second angular deflection to the differential gear, this second deflection having a magnitude representing wind direction angle $\theta_w$. This quantity $\theta_w$ is derived in a manner which will be explained later. The differential inputs are so sensed that the output shaft 78 has an angular deflection representing the difference of the inputs, or $\theta_w - \theta_H$.

The output shaft 78 is connected to position the rotor of a resolver 79 having its rotatable primary winding 81 connected to the alternating power terminals 46. The two secondary winding potentials then represent the sine and cosine of the angular input. Secondary winding 82 is connected to the end terminals of potentiometer 72, thus impressing thereon a potential representing cos $(\theta_w - \theta_H)$. The slider 83 of potentiometer 72 is positioned relative to terminal 71 by a shaft 84 having an angular deflection representative of wind speed $V_w$; this shaft is positioned by means which will be described later. The connections of the terminals of winding 82 are such that if the potential of end terminal 71 were taken as reference, the potential of slider 83 would represent minus $V_w \cos (\theta_w - \theta_H)$. However, since the potential of terminal 71 relative to ground is as described above, the potential of slider 83 relative to ground represents the algebraic difference of the potential of terminal 71 and of $V_w \cos (\theta_w - \theta_H)$, which is the right side of Equation 4 and is equal to $E_H$. It is evident that in this equation, when the first term on the right equals the sum of the second and third terms, $E_H$ becomes zero.

Another secondary winding 86 of the transformer 61 is connected to the end terminals of a sine potentiometer 87 having its center grounded, and its slider 88 is moved an amount equal to $\delta$ by the shaft 53, so that the slider output potential represents $V_g \sin \delta$ with the phase sense, depending on which side of the center tap the slider is located representative of the sign of the output quantity. This sign is positive or negative as $\delta$ is positive or negative. This function is the first term on the right of Equation 1. The slider potential representing this function is applied through conductor 89 to one end terminal 91 of a potentiometer 92. A winding 93 of resolver 79 has terminal output voltage representative of minus sin $(\theta_w - \theta_H)$. This voltage is applied to the potentiometer 92 end terminals, the slider 94 of which is moved by shaft 84 by an amount representing the value of $V_w$. The output potential of slider 94 is therefore the product of its position and the terminal potential or, relative to terminal 91, minus $V_w \sin (\theta_w - \theta_H)$. This is the second term of Equation 1. However, as the potential of terminal 91 is in general not zero, the slider 94 potential is the algebraic difference of the above function and the terminal 91 potential $V_g \sin \delta$, or $V_g \sin \delta - V_w \sin (\theta_w - \theta_H)$. This is the right-hand expression of Equation 1 and so is equal to $E_y$.

In general the positions of shafts 84 and 77 representative of the terms $V_w$ and $\theta_w$ are derived by transfer of the error terms $E_H$ and $E_y$ to another coordinate system and, by the use of two servomechanisms, shaft rotations are produced representative of the integrals of wind velocity error and wind angle error and therefore representative of wind velocity and angle. This procedure is completely explained in patent application Serial No. 537,011, referred to supra, and is briefly explained as follows.

In order to derive wind velocity error and wind angle error signals a four-winding resolver 96 is employed. This resolver has its two orthogonal rotor windings 97 and 98 connected through switch arms 99 and 101 to sliders 83 and 94 respectively, so that these windings 97 and 98 are excited by signals having the values $E_H$ and $E_y$. The resolver 96 is positioned relative to output winding 102 by shaft 78 to the angle $(\theta_w - \theta_H)$ so that the potential excited in the output winding 102 is that of the vector sum having a potential magnitude representing $V_w$ error. The output in the other output winding 103 then represents error in the $(\theta_w - \theta_H)$ angle. The output signal representing $V_w$ error is conducted from winding 102 by conductor 104 through a feedback generator winding 106 to a servoamplifier 107, and the amplified signal rotates a motor 108. The motor shaft 84 rotates the feedback generator 109 and positions the sliders 121, 83 and 94 of potentiometers 111, 72 and 92.

In the operation of this circuit any variation of the angular deflection of shaft 84 from a position representative of $V_w$ contributes to the generation of error signals $E_H$ and $E_y$. In general, so long as either error signal persists, motor 108 rotates in such direction as to move shaft 84 in the direction to reduce these signals.

The output of winding 103 similarly serves as an error signal, positioning a second servomechanism comprising motor 112, generator 113 and servoamplifier 114. The winding 103 is connected to excite servoamplifier 114 through a path including conductor 117, generator feedback winding 118, conductor 119, and part of potentiometer 111, slider 121 and conductor 122 to servoamplifier 14. Its output drives the motor 112 through conductor 123. The shaft 77 of motor 12 therefore takes a position representing the magnitude of angle $\theta_w$. Operation is similar to that of the $V_w$ servomechanism.

The wind computer has been designed to operate over a large range of wind speed values. It has been found, however, that as so far described and at low wind speeds the application of the full voltage of winding 103 causes the servomachanism of motor 112 to have an excessively large time constant. To correct this, the potentiometer 111 position by an amount equal to $V_w$ places a shunt across winding 118 having a resistance proportional to $V_w$, so that at low values of $V_w$ the damping of the servomechanism by generator 113 is greatly reduced.

In the operation of this circuit as so far described, with switches 29, 50, 99 and 101 in their positions for normal operation, marked N, signals representing wind speed $V_w$ and wind direction angle $\theta_w$ are generated but are not used in any way except that, if desired, they may be employed to actuate two indicators 124 and 126. Upon going from normal to memory operation, however, a shaft 127 operated by the device 22 actuates the four switches, 29, 50, 99 and 101 to their "memory" positions, marked "M." This operation changes the circuit, while at the same time $V_g$ and $\delta$ signals are no longer received from the measuring components of device 22, so that the wind signals $V_w$ and $\theta_w$ are utilized to generate $V_g$ and $\delta$ signals which remain good representation of actual aircraft ground speed and drift even upon change of course and speed. These $V_g$ and $\delta$ signals actuate indicators 26 and 54 and are fed through conductors 58 and 59 to device 22 for continued computation of position.

In memory operation, upon operation of switches 29, 50, 99 and 101 to their memory positions the $E_H$ error signal is transmitted through switch 99, its contact 128 and conductor 129 to rotor coil 131 of a resolver 132 which is identical with resolver 96 and has identical functions except that the outputs control $V_g$ and $\delta$ instead of $V_w$ and $\theta_w$. Error signal $E_y$ is similarly transmitted through switch 101, memory contact 133, and conductor 134 to rotor winding 136 of resolver 132. The rotor of resolver 132 is positioned by an amount equal to $\delta$ by motor 52, so that the output of stationary output winding 137 is a signal representing the $V_g$ component of the vector sum of orthogonal signals $E_H$ and $E_y$. This signal is presented as an error signal to motor 32 through a path including conductor 138, the memory contact 139 of switch 29, and servoamplifier 31. The other error signal output of resolver 132, representing error in $\delta$, is transmitted from winding 141 through conductor 142, memory contact 143 of switch 50 and servoamplifier 51 to motor 52.

Since switches 99 and 101 have left their normal operation contacts 144 and 146, the input windings 97 and 98 of resolver 96 are open and this resolver produces no output signals. The motors 108 and 112 therefore remain deenergized and their shafts, representing by their angular positions $V_w$ and $\theta_w$, are stationary. These quantities therefore continue to be inserted into the apparatus at their last-computed values.

What is claimed is:

1. A wind computer comprising, means for producing a signal representative of air speed, means for producing a signal representative of ground speed, subtracting means having said air speed and ground speed signals applied thereto and producing a difference signal therefrom, means for producing a signal representative of drift angle, means for producing a signal representative of heading angle, a first computing means having said difference signal, drift angle signal and heading angle signal applied thereto and producing therefrom a pair of signals representative respectively of wind speed and wind angle, second computing means, and means operative on the cessation of said ground speed and drift angle signals for applying the last attained values of said wind speed signal, wind angle signal, heading angle signal and air speed signal to said second computing means whereby said second computing means operates to produce signals representative of ground speed and drift angle.

2. A wind computer comprising, means for producing a signal representative of air speed, means for producing a signal representative of ground speed, means for subtracting said air speed and ground speed signals to produce a difference signal therefrom, means for producing a signal representative of drift angle, means for producing a signal representative of heading angle, computer means for equating said difference signal, ground speed signal and drift angle signal in terms of said heading angle signal and signals representative of wind speed and wind angle to produce error signals, means operated by said error signals to produce signals representative of corrected wind speed and wind angle, switch means actuated by cessation of signals representative of ground speed and drift angle for maintaining said corrected wind speed and wind angle signals at their last attained value, and means operated by the actuation of said switch means for utilizing said error signals to produce corrected ground speed and drift angle signals.

3. A wind computer comprising, means for producing a signal representative of air speed, means for producing a signal representative of ground speed, means for subtracting said air speed and ground speed signals to produce a difference signal, means for producing a signal representative of drift angle, means for producing a signal representative of heading angle, means for producing a signal nominally representative of wind speed, means for producing a signal nominally representative of wind angle, computer means for equating functions of said difference signal, ground speed signal and drift angle signal to functions of said wind speed signal, wind angle signal and heading angle signal to produce a pair of error signals representative of inequalities in computation in heading direction and transverse thereto, resolver means having said error signals impressed thereon, servomechanisms operated by the output of said resolver means for producing signals representative of corrected wind speed and wind angle, a second resolver, switch means operated by the cessation of signals representative of ground speed and drift angle for disconnecting said error signals from the input of said first mentioned resolver means and applying them to the input of said second resolver means, and means operated by said switch means and the output of said second resolver means for producing corrected ground speed and drift angle signals.

4. A wind computer comprising, means producing ground speed and drift input data signals, means for producing an output ground speed data signal from said ground speed input data signal, means for producing an output drift data signal from said drift input data signal, means producing an air speed output data signal, means subtracting said ground speed and air speed output data signals to produce a difference signal, means generating a heading reference signal, computing means having said heading reference signal, said difference signal and said output drift data signal impressed thereon and producing therefrom a pair of signals representative respectively of wind speed and wind angle, switching means operated by failure of said ground speed and drift input data signals to cause said pair of wind signals to retain their last attained value and means operated by said switching means for computing said output ground speed data and output drift data signals from the last attained value of said pair of wind signals, said air speed output data signal and said heading reference signal.

5. A wind computer comprising, a first servomechanism producing a signal representative of air speed, a second servomechanism producing a signal representative of ground speed, means for subtracting said air speed and ground speed signals to produce a difference signal, a third servomechanism producing a signal representative of drift angle, a fourth servomechanism producing a signal nominally representative of wind speed, a fifth servomechanism producing a signal nominally representative of wind angle, means for producing a signal representative of heading angle, a first computer means equating the algebraic sum of said difference signal and the product of said ground speed signal and the versed sine of said drift angle signal to the product of said wind speed signal and the cosine of the algebraic sum of said wind angle signal and said heading angle signal to produce a first error signal the magnitude of which is representative of the inequality of solution, a second computer means equating the product of said ground speed signal and the sine of said drift angle signal to the product of said wind speed signal and the sine of the algebraic sum of said wind angle signal and heading angle signal to produce a second error signal the magnitude of which is representative of the inequality of solution, a first resolver having a pair of input windings and a pair of output windings, a two position switch means normally operative to impress said error signals on respective input coils of said first resolver, means for impressing the outputs of the respective output windings of said first resolver on the inputs of said fourth and fifth servomechanisms, a second resolver having a pair of input and a pair of output windings, means operative by actuation of said switch means to its second position of operation for disconnecting said error signals from the input of said first resolver and impressing them on the respective input windings of said second resolver and simultaneously connecting the output windings of said second resolver to the respective inputs of said second and third servomechanisms.

References Cited in the file of this patent

UNITED STATES PATENTS

| | | |
|---|---|---|
| 2,715,995 | Wirkler | Aug. 23, 1955 |
| 2,752,091 | McKenney et al. | June 26, 1956 |